(12) United States Patent
Yamamoto et al.

(10) Patent No.: US 8,594,432 B2
(45) Date of Patent: Nov. 26, 2013

(54) IMAGE PROCESSING APPARATUS AND IMAGE PROCESSING METHOD

(75) Inventors: Takahisa Yamamoto, Kawasaki (JP); Masami Kato, Sagamihara (JP); Yoshinori Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 221 days.

(21) Appl. No.: 12/966,725

(22) Filed: Dec. 13, 2010

(65) Prior Publication Data
US 2011/0150341 A1 Jun. 23, 2011

(30) Foreign Application Priority Data
Dec. 18, 2009 (JP) ................................. 2009-288414

(51) Int. Cl.
G06K 9/46 (2006.01)
G06K 9/54 (2006.01)
H04N 1/60 (2006.01)

(52) U.S. Cl.
USPC ............................. 382/190; 382/305; 358/1.9

(58) Field of Classification Search
USPC ......... 382/115–118, 177, 188, 190, 192, 305, 382/312; 358/3.28, 1.13, 501, 502, 1.9; 348/222.1, 241, 246
See application file for complete search history.

(56) References Cited

U.S. PATENT DOCUMENTS

| | | | |
|---|---|---|---|
| 5,508,823 A | 4/1996 | Kiyohara et al. | |
| 6,650,362 B1 * | 11/2003 | Nakamura et al. | 348/222.1 |
| 7,095,891 B1 * | 8/2006 | Takebe et al. | 382/177 |
| 7,412,081 B2 * | 8/2008 | Doi | 382/118 |
| 7,683,948 B2 * | 3/2010 | Yanof et al. | 348/246 |
| 7,699,423 B2 | 4/2010 | Suwa et al. | |
| 7,881,524 B2 | 2/2011 | Matsugu et al. | |
| 8,103,087 B2 * | 1/2012 | Maeda et al. | 382/149 |
| 8,270,035 B2 * | 9/2012 | Tabata et al. | 358/3.28 |
| 8,300,120 B2 * | 10/2012 | Shohara | 348/241 |
| 8,447,076 B2 * | 5/2013 | Yamamoto et al. | 382/118 |
| 2006/0110029 A1 | 5/2006 | Kazui et al. | |
| 2009/0157707 A1 | 6/2009 | Ito et al. | |

(Continued)

FOREIGN PATENT DOCUMENTS

CN 1130844 A 9/1996
JP 3696212 B 9/2005

(Continued)

OTHER PUBLICATIONS

U.S. Appl. No. 12/901,364, filed Oct. 8, 2010. Applicant: Yoshinori Ito, et al.

(Continued)

*Primary Examiner* — Kanjibhai Patel
(74) *Attorney, Agent, or Firm* — Fitzpatrick, Cella, Harper & Scinto

(57) ABSTRACT

An image processing apparatus includes a comparison unit that selects a pixel of interest in a processing image, and compare magnitudes of luminance value of the pixel of interest and luminance value of each of a plurality of neighboring pixels having a predetermined positional relationship with the pixel of interest; a calculation unit that calculates a feature amount of the pixel of interest based on the predetermined positional relationship between the pixel of interest and each of the plurality of neighboring pixels and a comparison result obtained by the comparison unit. For two neighboring pixels at positions which are point symmetrical with respect to the pixel of interest, the comparison unit sets that only one of the two neighboring pixels has the predetermined positional relationship.

12 Claims, 11 Drawing Sheets

(56) References Cited

U.S. PATENT DOCUMENTS

| | | |
|---|---|---|
| 2010/0180189 A1 | 7/2010 | Ito et al. |
| 2010/0209010 A1 | 8/2010 | Kato et al. |
| 2011/0058741 A1 | 3/2011 | Ito et al. |

FOREIGN PATENT DOCUMENTS

| | | |
|---|---|---|
| JP | 2006-146626 A | 6/2006 |
| JP | 3831232 B | 10/2006 |
| JP | 2009-211490 A | 9/2009 |

OTHER PUBLICATIONS

U.S. Appl. No. 12/974,633, filed Dec. 21, 2010. Applicant: Masami Kato, et al.

U.S. Appl. No. 12/899,387, filed Oct. 6, 2010. Applicant: Masami Kato, et al.

Chinese Office Action dated Apr. 7, 2013 in Chinese Patent Application No. 201010600545.8.

Tao et al., "Intra prediction Mode Based on Symmetry for H.264", Computer Engineering, vol. 33, No. 24, Dec. 31, 2007.

* cited by examiner

F I G. 8

| ID INFORMATION | REGISTERED IMAGE NUMBER | FEATURE AMOUNT IMAGE |
|---|---|---|
| ID0 | 0 | F_0_0 |
| | 1 | F_0_1 |
| ID1 | 0 | F_1_0 |
| | 1 | F_1_1 |

F I G. 10
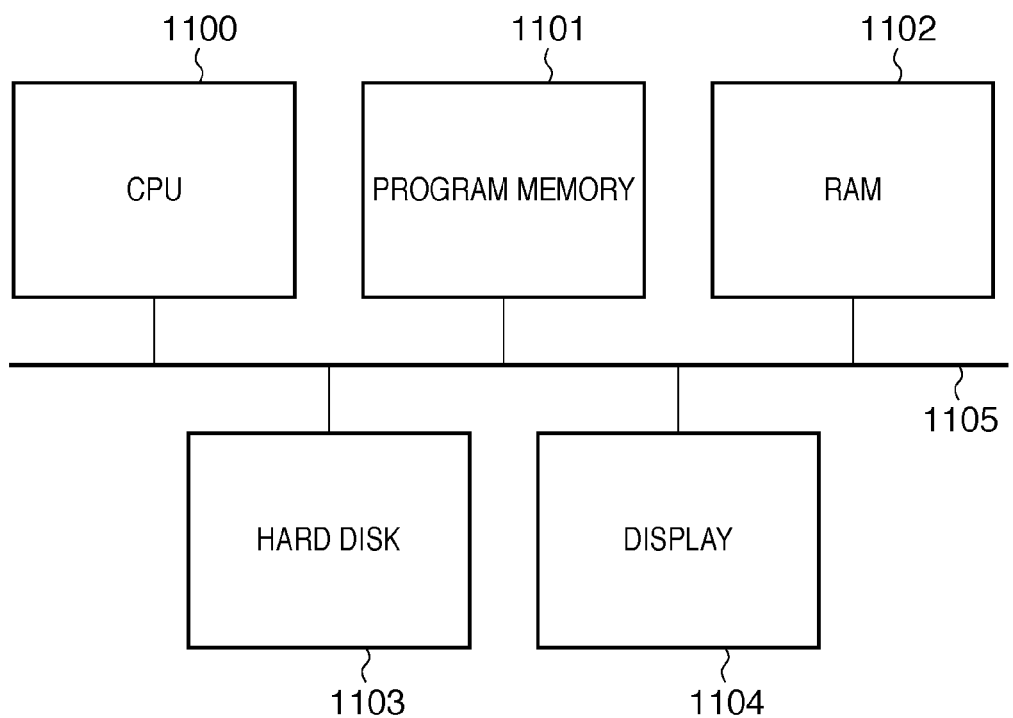

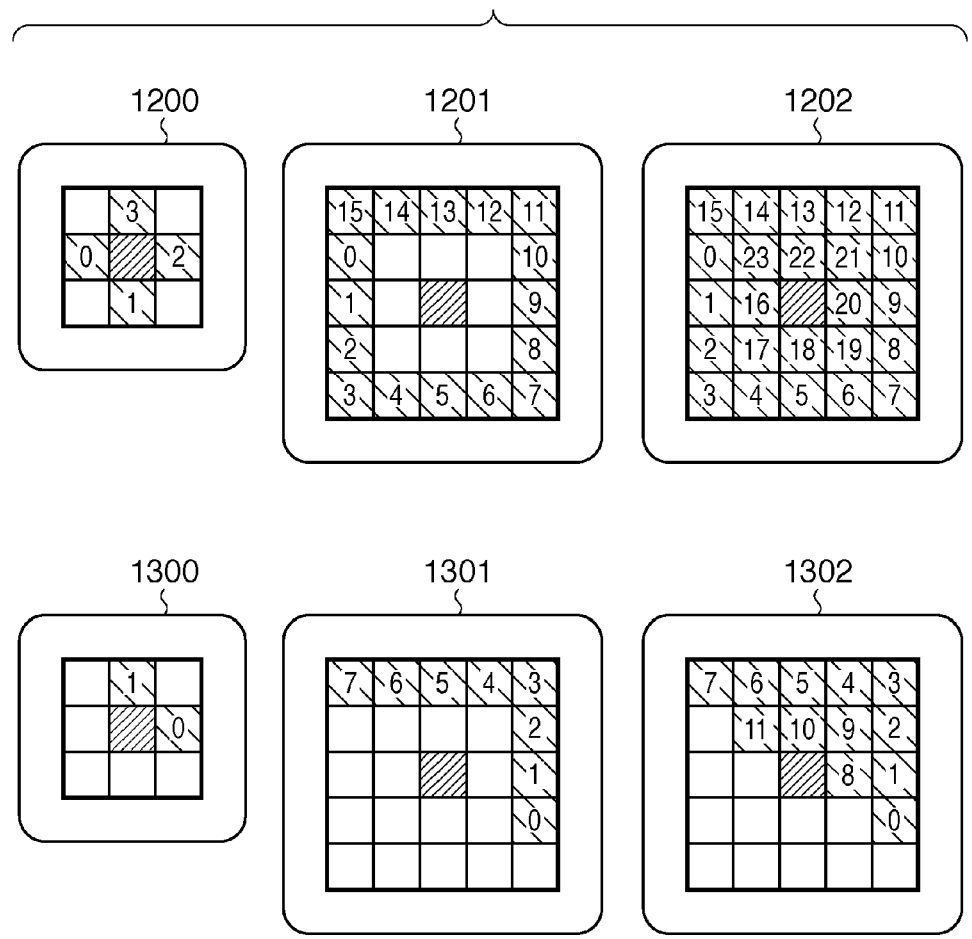
F I G. 11

IMAGE PROCESSING APPARATUS AND IMAGE PROCESSING METHOD

BACKGROUND OF THE INVENTION

1. Field of the Invention

The present invention relates to pattern matching in image processing technology.

2. Description of the Related Art

In recent years, a practical method for detecting a target pattern from an image by image processing has been proposed. In particular, if a target pattern is a human face, various applications can be considered. Research and development into detection methods is active. Furthermore, research and development is increasingly being made on a face recognition method for not only detecting a face but also identifying which of a set of preregistered people matches the detected face.

A matching method is often used as a detection/recognition method. In the matching method, a similarity between a template prepared in advance (registration image) and a processing image is calculated by recognition processing such as normalized correlation.

If the face detection/recognition technique using such as the matching method is applied in a real environment such as a monitoring system, the contrast of an image may change or a partial shadow may be produced in an image in accordance with weather changes or the time of day. In the real environment, variations in illumination condition may change an image appearance (pattern), and also largely influence detection/recognition accuracy.

To reduce this influence, instead of executing recognition processing for the luminance value of an image, it is proposed to extract a feature amount robust against an illumination variation from the luminance value, and then execute recognition processing for the extracted feature amount. Japanese Patent No. 3831232 describes, for example, a method for performing correlation processing for signs of luminance differences (peripheral increment signs) between a target pixel and its surrounding pixels. In this method, the increments (magnitude relationships) between the density value of the target pixel and those of the surrounding pixels are represented by signs in each of a template image and a processing image, and the number of matching signs is set as a similarity. It is known that such methods make it possible to execute matching which is robust against noise mixing and luminance variation within a range in which a sign is not inverted.

The technique described in Japanese Patent No. 3831232, however, calculates the similarity between the template image and the processing image. It was difficult to actually extend detection targets to those belonging to the same category but having their own individualities such as faces because it was necessary to prepare templates, the number of which is equal to that of faces.

To solve the problem, in Japanese Patent No. 3696212 and Japanese Patent Laid-Open No. 2006-146626, for example, the statistical characteristics of peripheral increment signs are extracted from a database containing detection target images such as various face images.

To detect a target pattern in a conventional manner, however, a large amount of memory was necessary to implement a table to hold measured occurrence probabilities using a database.

Applying a conventional method to a face recognition method which identifies, based on a face, which of a set of preregistered people matches the detected one makes a table size increase proportionately with the number of registered people.

SUMMARY OF THE INVENTION

The present invention provides a technique of decreasing the size of an occurrence probability table and reducing a necessary memory capacity, by limiting the direction of increment sign calculation with respect to neighboring pixels of a pixel of interest selected in a processing image.

According to one aspect of the present invention, there is provided an image processing apparatus comprising: a comparison unit adapted to select a pixel of interest in a processing image, and compare magnitudes of luminance value of the pixel of interest and luminance value of each of a plurality of neighboring pixels having a predetermined positional relationship with the pixel of interest; and a calculation unit adapted to calculate a feature amount of the pixel of interest based on the predetermined positional relationship between the pixel of interest and each of the plurality of neighboring pixels and a comparison result obtained by the comparison unit, wherein for two neighboring pixels at positions which are point symmetrical with respect to the pixel of interest, the comparison unit sets that only one of the two neighboring pixels has the predetermined positional relationship.

In the present invention, only one of two neighboring pixels at positions which are point symmetrical with respect to a pixel of interest is used for calculation of an LBP value. This, therefore, makes it possible to reduce a calculation amount for calculating an LBP image and decrease a memory amount for storing the LBP image.

Further features of the present invention will become apparent from the following description of exemplary embodiments (with reference to the attached drawings).

BRIEF DESCRIPTION OF THE DRAWINGS

FIG. 8 is a table showing the storage states of feature amount images in a registration feature amount image storage unit in the recognition system in the first embodiment;

FIG. 10 is a block diagram showing a hardware configuration according to the third embodiment; and FIG. 11 is a view showing neighboring pixels within a processing window in LBP value calculation processing according to a conventional technique and the present invention.

DESCRIPTION OF THE EMBODIMENTS

A recognition system using an image processing method according to the present invention will be described below.

Recognition indicates the process of associating an observed target object with one of several concepts (classes) in which target objects can be classified. For example, face recognition means an image processing method for identifying which of a set of preregistered people matches a face image present in an input image.

First Embodiment

This embodiment shows a case in which an image processing method according to the present invention is applied to a pattern recognition method. In particular, a case in which the image processing method is used as a pattern recognition application for face recognition will be explained. Assume that face detection processing (detection of the position, size, and inclination of a face in an image) which is necessary before face recognition processing has been already executed by some other method. The inclination of the face indicates intra-image rotation (in-plane rotation).

In the first embodiment, the image processing method according to the present invention is applied to the surrounding image of the face which is clipped in accordance with the face position, size, and inclination detected by the face detection processing, and normalized to a predetermined face size and inclination. Consequently, in the image which has been clipped by the face detection processing and normalized and to which the image processing method of the present invention is applied, the positions of eyes, nose, mouth, and the like are nearly uniform.

For descriptive convenience, assume that all images to be dealt with by the embodiment are gray-scale images (luminance images).

Figure 1:
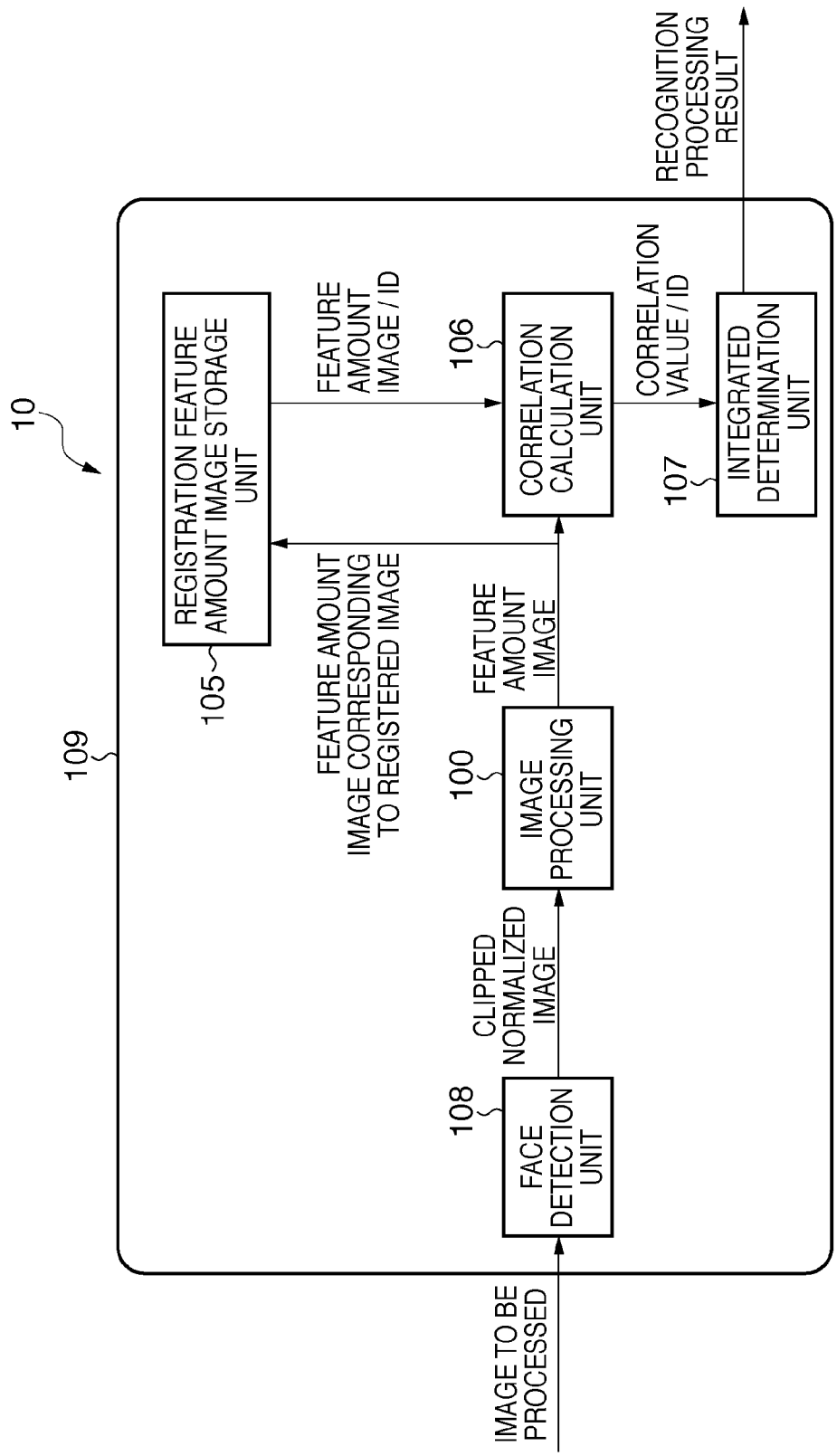
FIG. 1 is a block diagram showing a recognition system according to the first embodiment.

FIG. 1 is a block diagram showing the functional blocks of a face recognition system according to the first embodiment. A processing image is input to a face recognition system 109, which outputs a recognition processing result. The face recognition system 109 determines whether any of preregistered people is present in the processing image. If the system 109 determines that one of the preregistered people is present in the processing image, it outputs information for identifying the person as a recognition processing result; otherwise, it outputs information indicating that no one is present in the processing image.

The operation mode of the face recognition system 109 includes two modes, that is, a registration mode and recognition mode. In the registration mode, a registration image (an image in which a person to be recognized is present) is input as a processing image, and a feature amount image is stored in a registration feature amount image storage unit 105. In the recognition mode, an inspection image (an image to be inspected for determining whether a person to be recognized is present in the image) is input as a processing image, and the system 109 compares the feature amount image stored in the registration feature amount image storage unit 105 in the registration mode with the feature amount image of the inspection image. The processing of each operation mode and each block will be described below.

For the input processing image, a face detection unit 108 uses a predetermined face detection method to detect a face in the image, and identify its position, size, and direction. The face detection unit 108 normalizes the face size to a predetermined one based on the identified face position, size, and direction. The unit 108 creates and outputs a clipped normalized image, by clipping a face image so that the face inclines in a predetermined direction (for example, face is erect). A well-known technique may be used for face detection by the face detection unit 108. Face detection may be performed using, for detection processing, an image processing method in a configuration to be shown in the second embodiment.

An image processing unit 100 executes feature amount image generation processing for the clipped normalized image created by the face detection unit 108, and outputs a 4-bit LBP feature amount image in the registration mode and an 8-bit LBP image restored from the 4-bit LBP image in the recognition mode. The image processing unit 100 also includes a luminance value difference calculation unit adapted to calculate the difference between the luminance value of a pixel of interest and that of a surrounding pixel for calculating a feature amount. A correlation calculation unit 106 serving as the first correlation calculation unit restores an 8-bit LBP inspection feature amount image from a 4-bit LBP inspection feature amount image registered in the registration feature amount image storage unit 105. Then, the unit 106 performs correlation calculation between the restored inspection feature amount image and the feature amount image calculated by the image processing unit. At this time, the registration feature amount image storage unit 105 stores a plurality of 4-bit LBP feature amount images for registration. Based on a correlation value and ID information sent from the first correlation calculation unit 106, an integrated determination unit 107 determines whether any of the preregistered people is present in the inspection image.

The present invention uses a Local Binary Pattern (to be referred to as LBP hereinafter) operator, and thus part of LBP related to the present invention will be described.

An LBP value calculated by the LBP operator used in the embodiment will be referred to as a 4-bit LBP value for distinguishing from a conventional 8-bit LBP value. The LBP value in the present invention is not limited to a 4-bit LBP value, as will be shown in embodiments to be described later. For descriptive convenience, a 4-bit LBP value is used. Similarly, the conventional LBP value will be referred to as an 8-bit LBP value. An LBP image including LBP values calculated according to the present invention will be referred to as a 4-bit LBP image to distinguish it from an LBP image including conventional 8-bit LBP values. Similarly, a conventional LBP image will be referred to as an 8-bit LBP image.

It is possible to restore an 8-bit LBP image almost completely from a 4-bit LBP image including 4-bit LBP values. That is, it is possible to replace a conventional 8-bit LBP image with a 4-bit LBP image created according to the embodiment with almost no loss in the amount of information.

Figure 2:
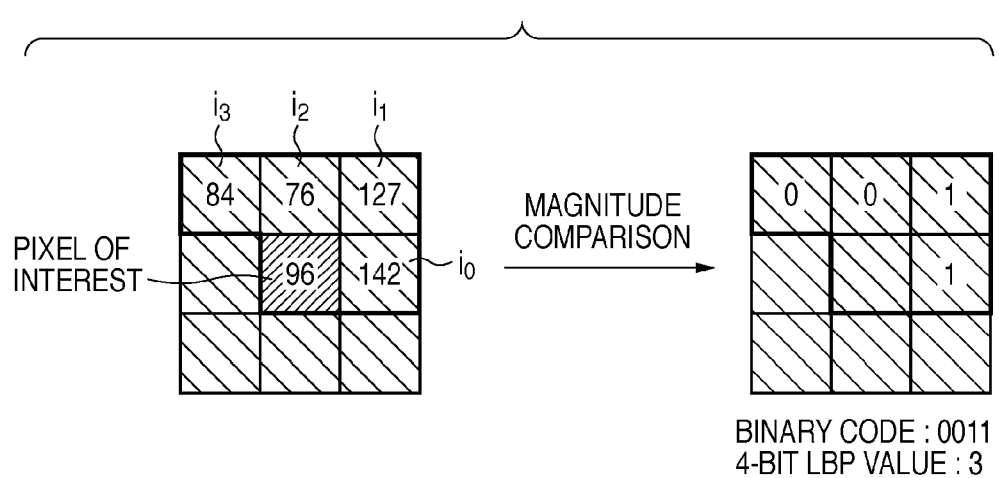
FIG. 2 is a view schematically showing LBP value calculation processing.

FIG. 2 is a view schematically showing processing of calculating LBP values based on the relative positional relationships between a pixel of interest and its neighboring pixels according to the embodiment. The neighboring pixels are adjacent to each other.

Figure 3:
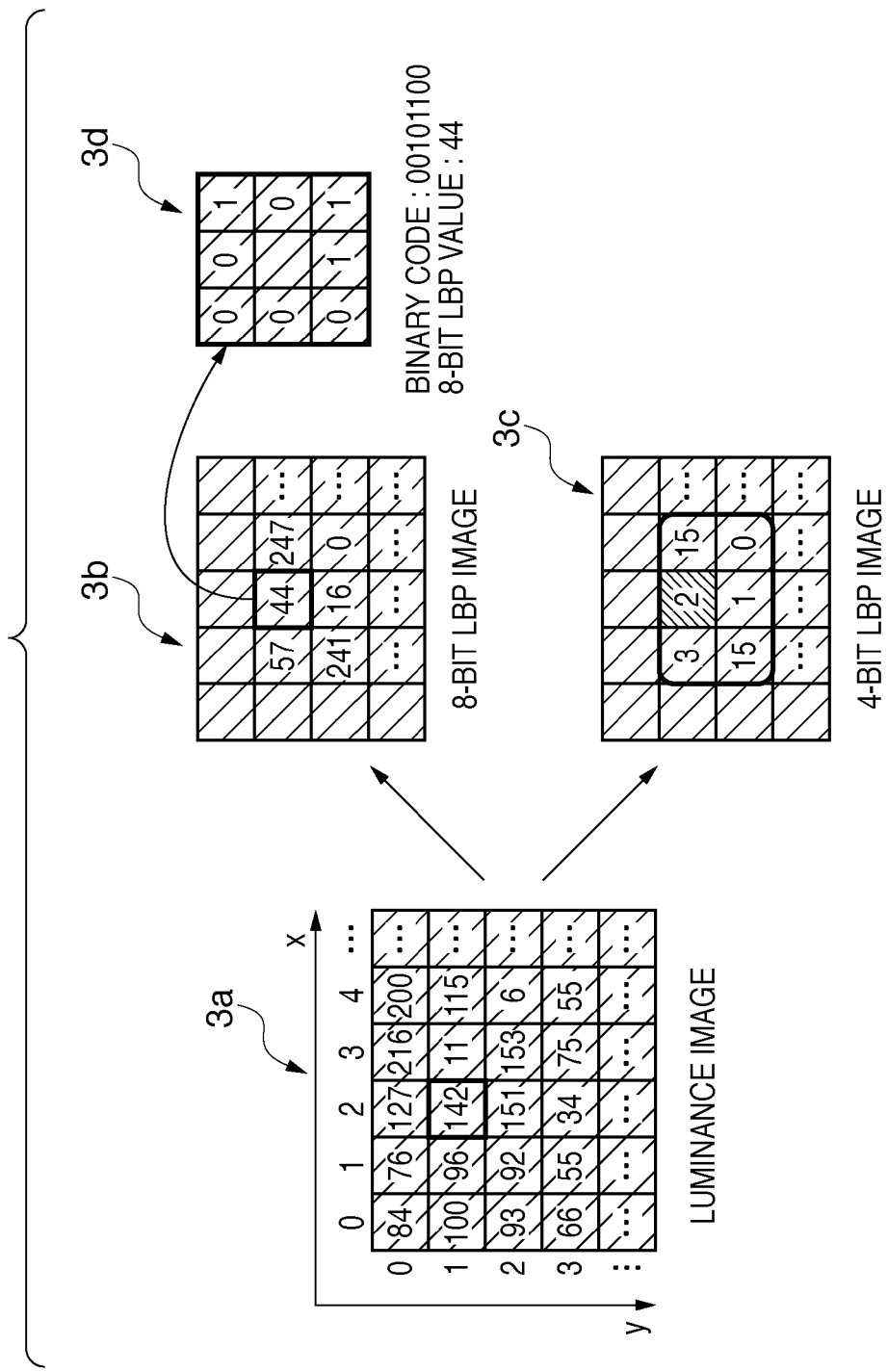
FIG. 3 is a view showing comparison of a 4-bit LBP image in the first embodiment and a conventional 8-bit LBP image.
Figure 4:
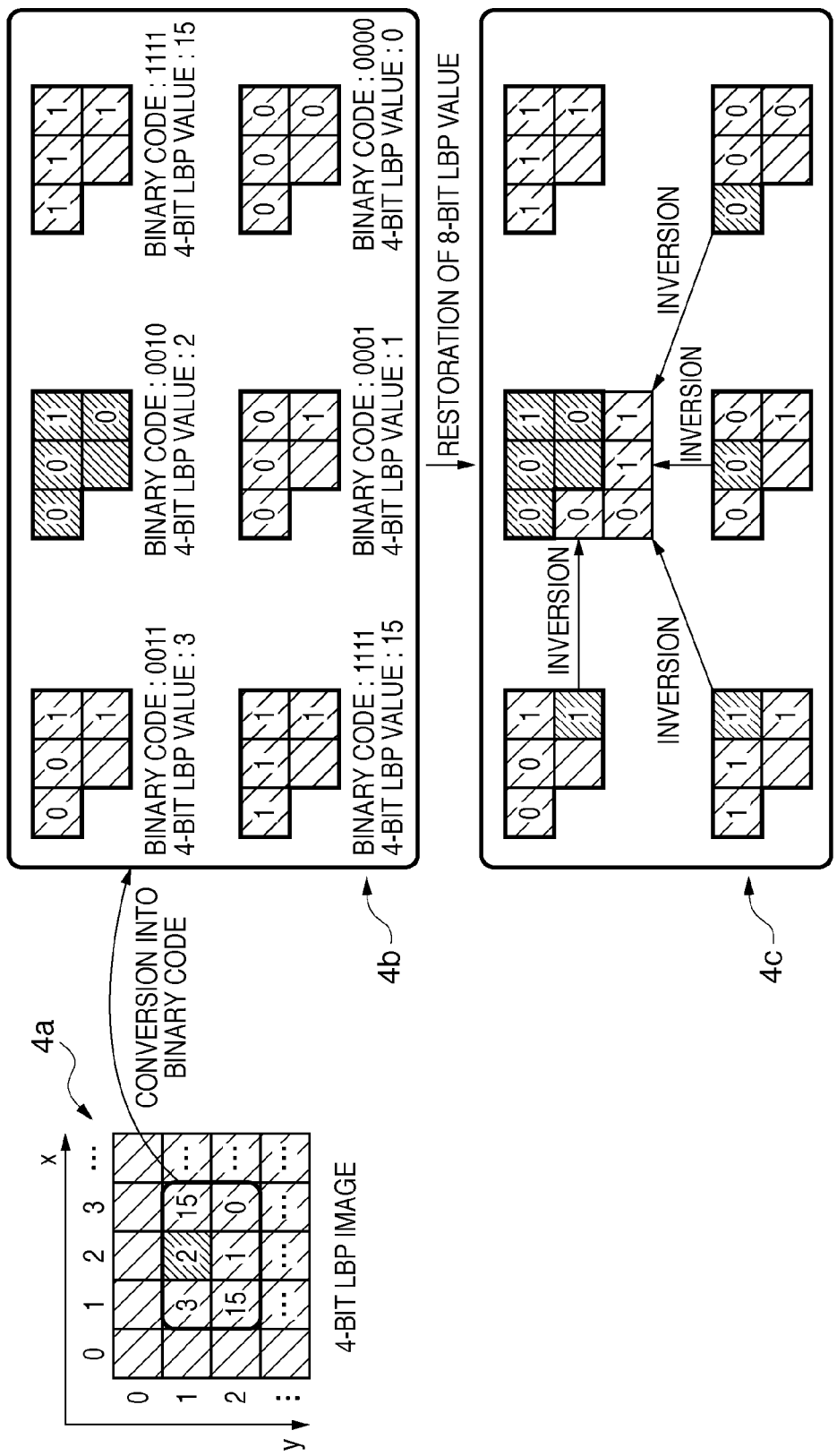
FIG. 4 is a view showing a method for restoring a conventional 8-bit LBP image from a 4-bit LBP image in the first embodiment.

Each of FIGS. 3 and 4 shows a method for restoring an 8-bit LBP feature image from a 4-bit LBP feature image. 4-bit LBP values used in FIG. 3 are calculated in accordance with the following equations. The meanings of variables are common to equations (1) and (2). As shown in FIG. 2, an index n of the upper left neighboring pixel with respect to a position $(x_c, y_c)$ is set to 3 and the index n is decremented by one clockwise.

$$LBP4(x_c, y_c) = \sum_{n=0}^{3} s(i_n - i_c) 2^n \quad (1)$$

$$s(p) = \begin{cases} 1 & \text{if } p \geq 0 \\ 0 & \text{if } p < 0 \end{cases} \quad (2)$$

In a luminance image in 3a of FIG. 3, numerical values in cells indicate luminance values. In an 8-bit LBP image in 3b of FIG. 3, numerical values in cells represent 8-bit LBP values. Furthermore, in a 4-bit LBP image in 3c of FIG. 3, numerical values in cells indicate 4-bit LBP values.

FIG. 3 shows a process in which an example of a binary code shown in 3d of FIG. 3 is created by the numerical processes of 3a and 3b in FIG. 3. Reference symbols x and y denote coordinate axes. For example, a luminance value at a coordinate point (2, 1) in the luminance image is 142. Similarly, LBP values at the coordinate point (2, 1) in the 8-bit and 4-bit LBP images are 44 and 2, respectively.

3b in FIG. 3 shows an example of processing for creating an LBP pixel (a cell with thick lines) with the LBP value 44 in the 8-bit LBP image as a result of magnitude comparison of the luminance value of a selected pixel of interest and those of its eight neighboring pixels. As is apparent from equations (1) and (2), if the luminance value of a neighboring pixel is larger than (or equal to) that of the pixel of interest, 1 is set; otherwise, 0 is set.

FIG. 4 shows an example of processing for restoring the 8-bit LBP value 44 (an example of processing for restoring the 8-bit LBP value at the coordinate point (2, 1)) as an example of processing for restoring an 8-bit LBP image from a 4-bit LBP image. The 4-bit LBP images in FIGS. 3 and 4 are identical. In 4a of FIG. 4, a pixel (4-bit LBP value 2) corresponding to the pixel (pixel to be restored) with the LBP value 44 in the 8-bit LBP image is densely hatched to be identified.

4b in FIG. 4 shows a case in which with respect to six neighboring pixels of a pixel of interest indicated by a frame with thick lines in the 4-bit LBP image, binary codes (obtained by arranging magnitude comparison results) are shown. The binary codes are regarded as binary numbers and then represented by decimal numbers, thereby obtaining LBP values. The LBP values and the binary codes are encoded to be in a one-to-one correspondence with each other. It is, therefore, possible to restore the 4-bit LBP values to the binary codes. 4c in FIG. 4 shows a method for restoring the 8-bit LBP values from the 4-bit binary codes. In this embodiment, the restoration processing is executed by the image processing unit 100 and correlation calculation unit 106 of FIG. 1.

First, the 8-bit LBP value and 4-bit LBP value at the coordinate point (2, 1) in FIG. 3 are referred to. To calculate the 8-bit LBP value at the coordinate point (2, 1), it is necessary to compare the luminance value at the coordinate point (2, 1) with luminance values at the following eight coordinate points.

A: coordinate point (1, 0): luminance value 76
B: coordinate point (2, 0): luminance value 127
C: coordinate point (3, 0): luminance value 216
D: coordinate point (3, 1): luminance value 11
E: coordinate point (3, 2): luminance value 153
F: coordinate point (2, 2): luminance value 151
G: coordinate point (1, 2): luminance value 92
H: coordinate point (1, 1): luminance value 96

To calculate the 4-bit LBP value at the coordinate point (2, 1), it is necessary to compare the luminance value at the coordinate point (2, 1) with the luminance values at the first four coordinate points (A to D) of the above eight coordinate points. If the results of comparison of the luminance value at the coordinate point (2, 1) and the luminance values at the last four coordinate points (E to H) are obtained in some way, it is possible to restore the 8-bit LBP value at the coordinate point (2, 1).

In this case, when a 4-bit LBP value at the coordinate point (3, 2) is calculated, the coordinate point (3, 2) indicated by E and the coordinate point (2, 1) are compared, that is, the luminance value is calculated. It is, therefore, possible to calculate the 8-bit LBP value from the binary code of the 4-bit LBP value at the coordinate point (3, 2). More specifically, when inverting (if the start bit is 0, 1 is set; otherwise, 0 is set) the start bit (the third bit when starting with 0 from the right; in the lower right side (4c) of FIG. 4, a densely hatched cell) of the binary code of the 4-bit LBP value at the coordinate point (3, 2), the result of comparison of the coordinate points (2, 1) and (3, 2) is obtained. The inversion operation is done for switching between "subtrahend" and "minuend". That is, the inversion operation switches the luminance value at the coordinate point (2, 1) and that at the coordinate point (3, 2) between a minuend and subtrahend when the 4-bit LBP value at the coordinate point (2, 1) is calculated or when the 4-bit LBP value at the coordinate point (3, 2) is calculated.

Similarly, it is possible to determine the results of comparison of the luminance values indicated by F, G, and H from the binary codes of the 4-bit LBP values at the coordinate points (2, 2), (1, 2) and (1, 1), respectively. In 4c of FIG. 4, a bit in the densely hatched cell of each binary code is inverted.

As described above, it is possible to determine the binary code of the 8-bit LBP value at the coordinate point (2, 1). After that, the binary code is converted into an 8-bit LBP value.

To summarize the above procedure, an 8-bit LBP value (LBP8(x, y)) at a coordinate point (x, y) is calculated from a 4-bit LBP value (LBP4(x, y)) at the coordinate point (x, y) in accordance with the following equation:

$$LBP8(x, y) = (LBP4(x, y) << 4) + \quad (3)$$
$$(\overline{LBP4(x+1, y+1)[3]} << 3) + (\overline{LBP4(x, y+1)[2]} << 2) +$$
$$(\overline{LBP4(x-1, y+1)[1]} << 1) + (\overline{LBP4(x-1, y)[0]} < 0)$$

where LBP4(x, y)[n] indicates the nth bit (starting with 0 from the right) of the binary code of the 4-bit LBP value (LBP4(x, y)) at the coordinate point (x, y). For example, since LBP4(2, 1)[1] represents the first bit (starting with 0 from the right) of the binary code (0010) of the 4-bit LBP value (2) at the coordinate point (2, 1), 0 is set.

As described above, it is possible to generate a feature amount image by restoring an 8-bit LBP image from a 4-bit LBP image. However, restoration is not always possible. When, for example, two coordinate points having equal luminance values are compared to calculate a 4-bit LBP value, it is impossible to correctly restore an 8-bit LBP image. In a typical image, however, a pair of coordinate points at which luminance values are compared to calculate a 4-bit LBP image rarely have equal luminance values.

It is, therefore, possible to restore an 8-bit LBP image from a 4-bit LBP image almost completely. This means that a 4-bit LBP image created in the embodiment has an amount of information held by a conventional 8-bit LBP image with almost no loss in the information. Note that although quantization to binary codes has been explained above by way of example, the present invention is not limited to this. For example, when quantization to ternary codes using equations (5) and (6) (to be described later) is performed, that is, when one luminance value is larger than the other, or vice versa, or two luminance values are equal to each other, it is possible to restore an LBP image.

The image processing unit 100 in FIG. 1 executes feature amount image generation processing for the clipped normalized image created by the face detection unit 108 to output a 4-bit feature amount image. Feature amount extraction processing executed by the image processing unit 100 will be explained below. The first embodiment shows a case in which the image processing unit outputs a 4-bit LBP image including 4-bit LBP values in the registration mode, and outputs a restored 8-bit feature amount image in the recognition mode. Any four neighboring pixels of the eight neighboring pixels necessary for calculating a conventional 8-bit LBP value may be used to calculate a 4-bit LBP value as long as the four neighboring pixels exist within a predetermined range from a pixel of interest and one of two neighboring pixels at positions which are point symmetrical with respect to the pixel of interest is used.

Figure 5:
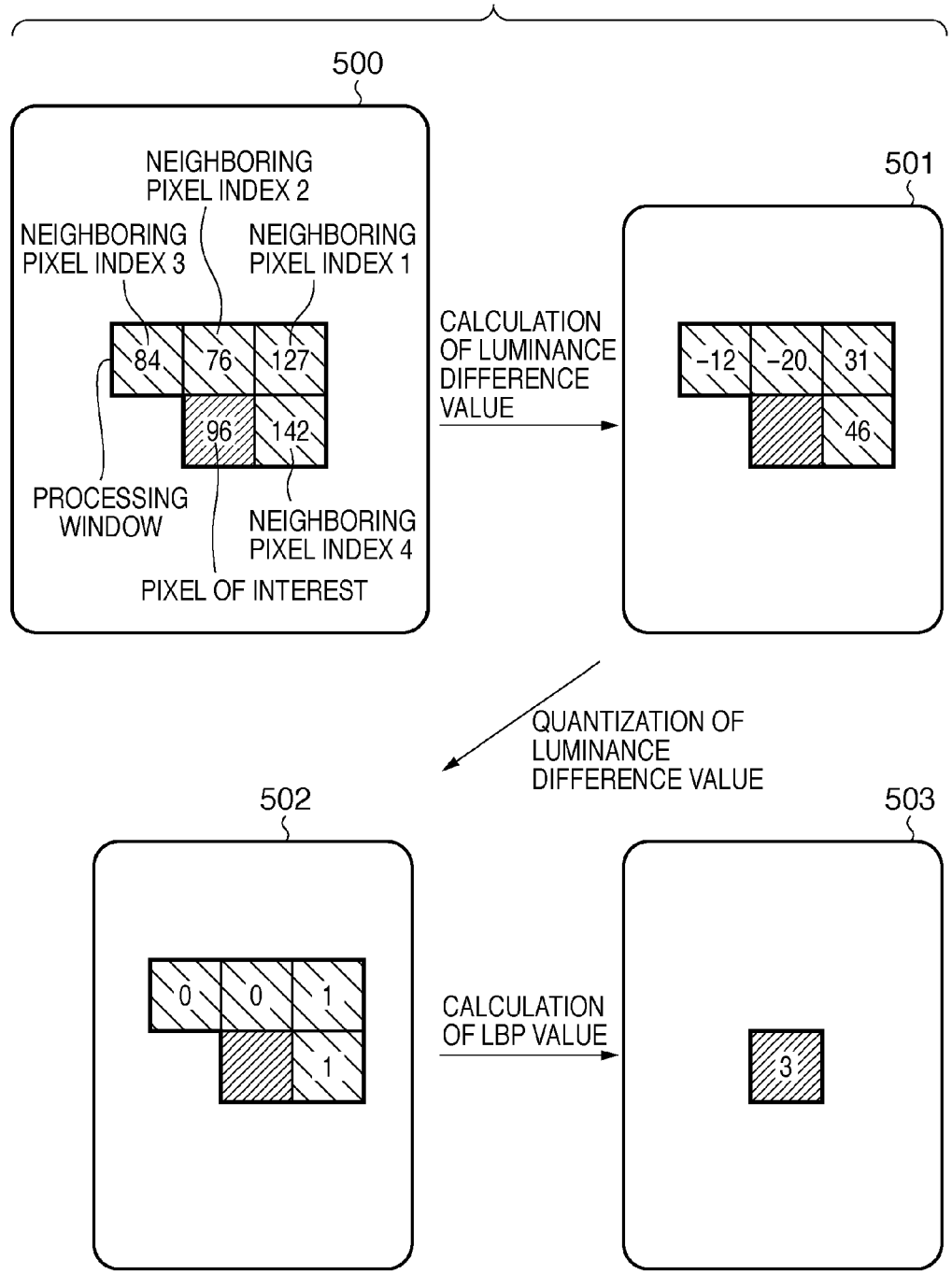
FIG. 5 is a view schematically showing the processing of an image processing unit in the recognition system in the first embodiment.

FIG. 5 shows a feature amount image generation procedure when a processing window 701 is positioned at a given scan position. The calculation processing of a 4-bit LBP value shown in FIG. 2 is compared with that of a conventional 8-bit LBP value in FIG. 5. Referring to FIG. 2, only one of two neighboring pixels at positions which are point symmetrical with respect to a selected pixel of interest (indicated by a hatched cell in FIG. 2) is used for the feature amount image generation processing. Four bits to be used are appropriately selected in advance.

Figure 6:
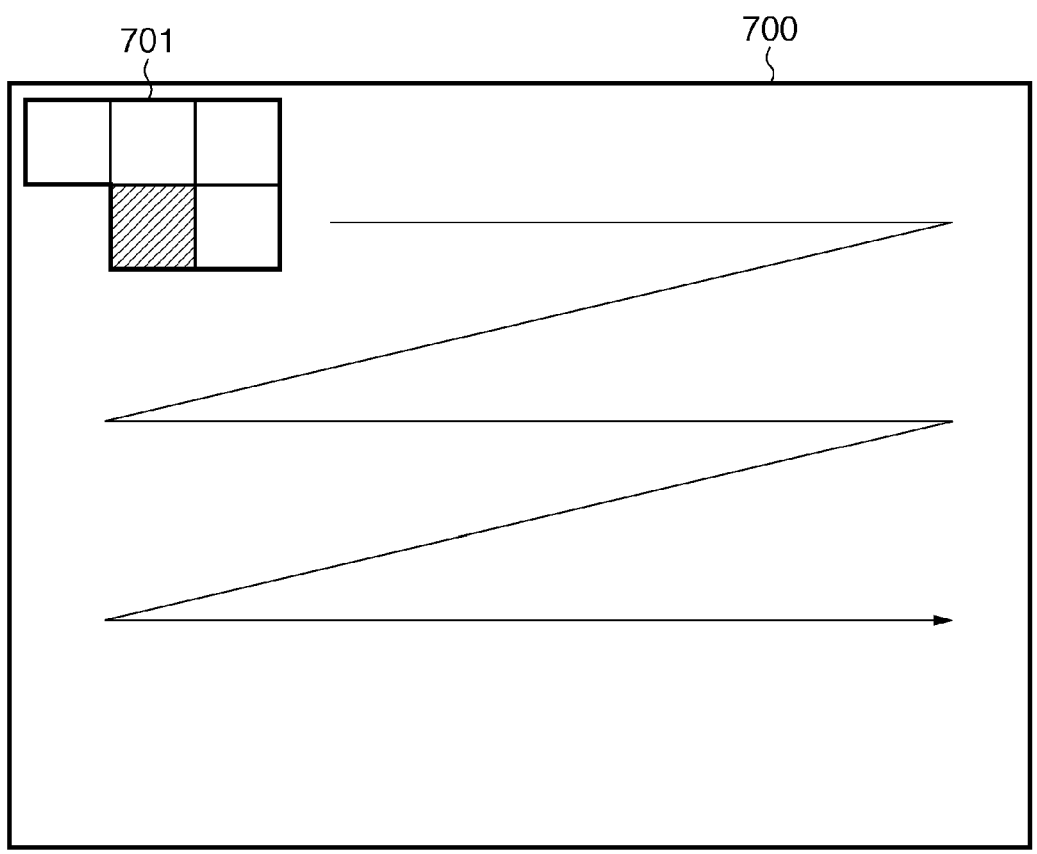
FIG. 6 is a view showing a case in which a processing window scans a clipped normalized image in the first embodiment.

FIG. 6 shows how to generate a feature amount image (4-bit LBP image) in the clipped normalized image. A portion denoted by reference numeral 700 in FIG. 6 indicates the clipped normalized image. A frame with thick lines (with a size of five pixels) represents the processing window 701. The image processing unit 100 in FIG. 1 scans the processing window 701 in the clipped normalized image while calculating a feature amount (4-bit LBP value) at each scan position. In the first embodiment, assume that a step for scanning is set to one pixel in both horizontal and vertical directions. The portion of a pixel of interest in the processing window 701 in FIG. 6 is hatched.

In a frame denoted by reference numeral 500, the luminance values of pixels within the processing window 701 at a given scan position are shown. Referring to FIG. 5, a frame with thick lines shows the processing window. At each scan position, a pixel indicated by a hatched portion within the processing window is referred to as a pixel of interest, and its surrounding pixels are referred to as neighboring pixels. As shown in FIG. 5, a plurality of neighboring pixels (four pixels in this embodiment) are present. To discriminate between neighboring pixels, indexes are given. The upper left neighboring pixel when seen from the center is given index 3, and then each of the remaining neighboring pixels is given index 2, 1, or 0 obtained by decrementing 3 by one clockwise. In the frame denoted by reference numeral 500, the luminance value of the pixel of interest is 96, that of the neighboring pixel with index 3 is 84, and that of the neighboring pixel with index 2 is 76.

Figure 7:
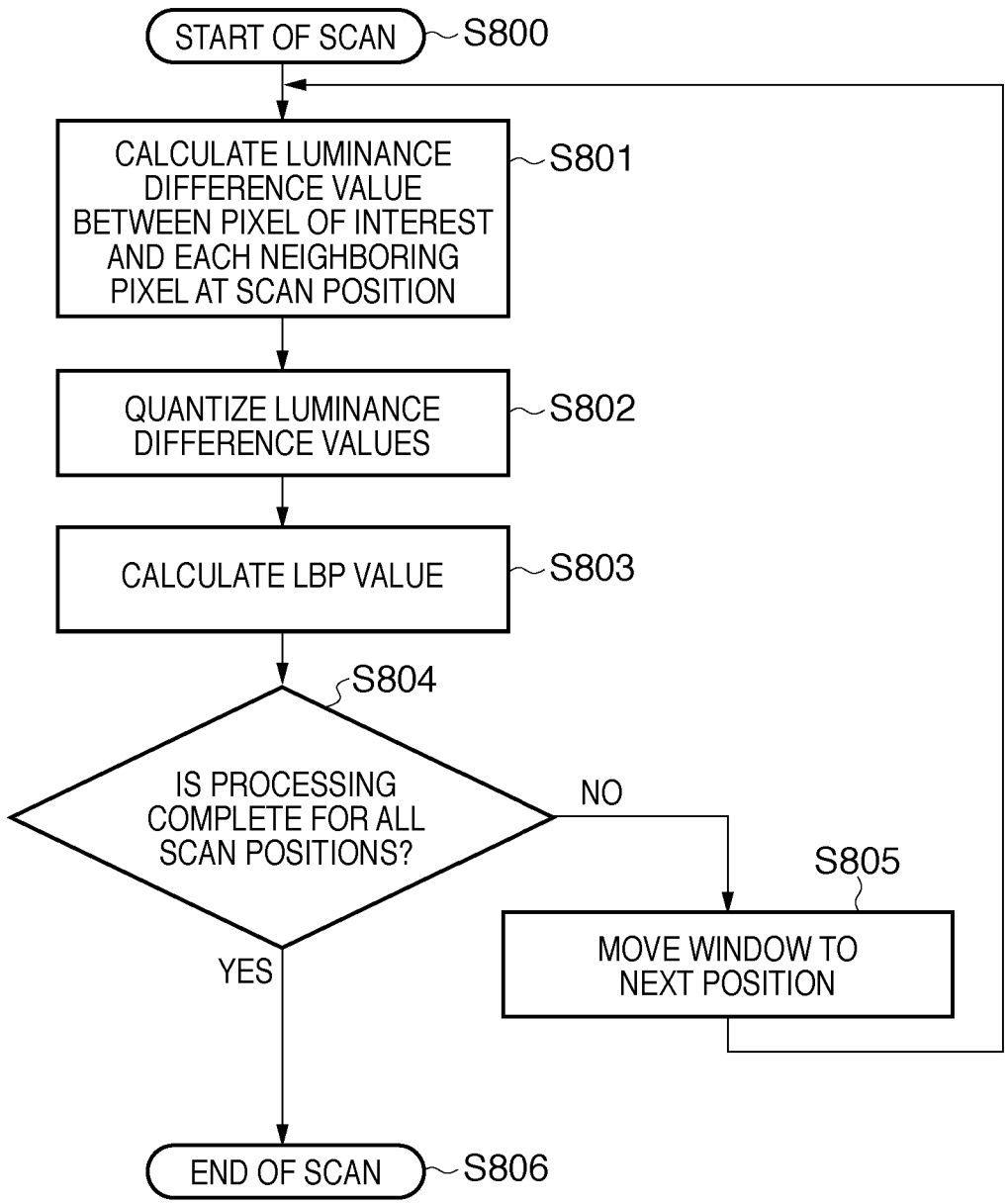
FIG. 7 is a flowchart illustrating a processing procedure of the image processing unit in the recognition system in the first embodiment.

FIG. 7 is a flowchart illustrating processing executed by the image processing unit 100. In step S800, the image processing unit 100 starts scanning of the processing window 701 for the clipped normalized image 700. In step S805, when moving the processing window 701 to a new scan position, the image processing unit 100 refers to the luminance values of a pixel of interest and its neighboring pixels at the new scan position.

In step S801, the image processing unit 100 uses a reference result obtained in step S805 to compare the magnitudes of the luminance values of the pixel of interest and its neighboring pixels at the scan position. First, the unit 100 obtains luminance difference values between the pixel of interest and its neighboring pixels at the scan position.

In this embodiment, a luminance difference value is obtained by subtracting the luminance value of the pixel of interest from that of a neighboring pixel. Since a luminance difference value is calculated for each neighboring pixel, luminance difference values the number of which are equal to that of the neighboring pixels are obtained (this corresponds to calculation of difference values within a frame 501 in FIG. 5).

In step S802, the image processing unit 100 executes quantization processing for the luminance difference values. In this embodiment, the number of quantization levels of the quantization processing is two. If a luminance difference value is equal to or larger than zero, it is quantized to 1; otherwise, it is quantized to 0 (this corresponds to quantization of the luminance difference values within a frame 502 in FIG. 5). The quantization processing corresponds to processing of equation (4) for each neighboring pixel index.

In step S803, the image processing unit 100 calculates an LBP value. In this case, the unit 100 calculates an LBP value using equation (3) based on the neighboring pixel indexes and quantized values each corresponding to each index (this corresponds to calculation of a difference value within a frame 503 in FIG. 5). Assume that this LBP value is set as a pixel value at the position of the pixel of interest in an LBP image.

If it is determined in step S804 that the image processing unit 100 has completed the processing in steps S801 to S803 for all scan positions, the process advances to step S806; otherwise, the process advances to step S805 to move the window to a next position.

In step S806, the image processing unit 100 terminates scanning to end the image processing for the clipped normalized image.

When the processing of the image processing unit 100 ends for a given clipped normalized image, a feature amount image (4-bit LBP image) having extracted feature amounts (4-bit LBP values) as pixel values is generated. Although not shown in FIG. 7, the image processing unit 100 outputs the 4-bit LBP feature amount image in the registration mode, and outputs an 8-bit feature amount image restored from the 4-bit LBP feature amount image in recognition mode.

The registration feature amount image storage unit 105 in FIG. 1 stores a feature amount image corresponding to a registered image. In this example, assume that a 4-bit LBP feature amount image according to the present invention is stored. The registered image represents an image in which a person to be recognized is present.

If the face recognition system 109 in FIG. 1 is in the registration mode, for a registered image, the face detection unit 108 executes face detection processing and the image processing unit 100 performs feature amount generation processing, thereby outputting a 4-bit LBP feature amount image. The registration feature amount image storage unit 105 stores the feature amount image corresponding to the registered image. The unit 105 also stores ID information (such as a name) for identifying a person in the registered image in association with the feature amount image.

FIG. 8 shows feature amount images stored in the registration feature amount image storage unit 105. FIG. 8 shows a case in which registered people (people to be recognized) include two people with ID0 and ID1. In this example, for each registered person, feature amount images (two feature amount images F_0_0 and F_0_1 for ID0, or F_1_0 and F_1_1 for ID1) are created using two registered images and then stored.

If the face recognition system 109 is in the recognition mode, the stored feature amount images and their ID information are sequentially output from the registration feature amount image storage unit 105. When the registration feature amount image storage unit 105 stores the feature amount images, as shown in FIG. 8, the 4-bit LBP feature amount images F_0_0, F_0_1, F_1_0, and F_1_1 are sequentially output, and the pieces of ID information ID0, ID0, ID1, and ID1 of the feature amount images are output.

The correlation calculation unit 106 serving as the first correlation calculation unit in FIG. 1 restores an 8-bit inspection feature amount image from a 4-bit inspection feature amount image serving as a registered image (inspection image) sent from the registration feature amount image storage unit 105, and performs correlation calculation between the restored inspection feature amount image and the feature amount image generated by the image processing unit 100. Since any correlation calculation method may be used, a well-known technique is used. In this embodiment, assume that normalized correlation calculation is executed.

If the registration feature amount image storage unit 105 stores the feature amount images, as shown in FIG. 8, the correlation calculation unit 106 performs normalized correlation calculation between the restored feature amount image of the inspection image and the restored feature amount image F_0_0 to calculate a correlation value. After that, the unit 106 executes normalized correlation calculation between the restored feature amount image of the inspection image and the restored feature amount image F_0_1 to calculate a correlation value. Similarly, the unit 106 performs normalized correlation calculation between the restored feature amount image of the inspection image and the restored feature amount images F_1_0 and F_1_1 to calculate correlation values, respectively. The calculated correlation values are output together with the pieces of ID information associated with the feature amount images of the registered images used for correlation value calculation. The number of correlation values calculated by the correlation calculation unit 106 is equal to that (four in FIG. 8) of the feature amount images stored in the registration feature amount image storage unit 105.

Based on the correlation values and ID information sent from the correlation calculation unit 106, the integrated determination unit 107 in FIG. 1 determines whether any of the preregistered people is present in the inspection image. Since any determination method may be used, a well-known method is used. In this embodiment, an average value (correlation value average) of correlation values is calculated for each piece of ID information, and a largest value (largest correlation value average) among the average values is obtained. If the largest correlation value average exceeds a predetermined threshold, it is determined that a person having ID information associated with the largest correlation value average is in the inspection image. If the largest correlation value average does not exceed the predetermined threshold, it is determined that no registered person is in the inspection image. The face recognition system using the image processing has been explained.

Although in this embodiment, the recognition system has the registration mode and recognition mode as operation modes, the registration mode is not essential. Instead of the registration mode, the same processing as that in the registration mode may be executed offline in advance for a registered image to calculate a feature amount image, and store the feature amount image in the registration feature amount image storage unit 105.

The feature amount image shown in this embodiment is a 4-bit LBP image including 4-bit LBP values obtained by using FIG. 5 and equations (3) and (4). A method for calculating a 4-bit LBP value, however, is not limited to the above-described method. The present invention is characterized in that the feature amount calculation method uses only one of two neighboring pixels at positions which are point symmetrical with respect to a pixel of interest to generate a feature amount image. As long as such feature amount image generation method is used, any technique is possible.

In the above explanation, in the LBP value calculation processing in FIG. 5 corresponding to step S803 in FIG. 7, an LBP value is calculated by processing equation (3). Equation (4) below, however, may be used for calculation. Equations (4) and (3) are different in addend (represented by a power of 2) which is to be added in accordance with a magnitude relationship between a pixel of interest and a neighboring pixel to calculate an LBP value and which corresponds to each neighboring pixel index. This addend to be added in accordance with a neighboring pixel index will be referred to as a weight value. In equation (1), a weight value corresponding to neighboring pixel index 3 (which indicates the upper left pixel of the pixel of interest) is $2^3$ (=8). In equation (4), the weight value is $2^0$ (=1).

$$LBP4(x_c, y_c) = \sum_{n=0}^{3} s(i_n, i_c) 3^{3-n} \qquad (4)$$

A correspondence between a neighboring pixel index and a weight value is not limited to the above example, as a matter of course. Weight values 8, 4, 2, and 1 respectively correspond to neighboring pixel indexes 3, 2, 1, and 0 in equation (1) and weight values 1, 2, 4, 8 respectively correspond to neighboring pixel indexes 3, 2, 1, and 0 in equation (4). It is, however, possible to arbitrarily set correspondences between neighboring pixel indexes and weight values.

A weight value is not limited to a power of 2. Any value may be used as long as the value is set so that it is possible to recognize a calculated LBP value and a weight value corresponding to each neighboring pixel index, and perform an inverse operation to obtain a magnitude relationship between a pixel of interest and each neighboring pixel. In this way, it is possible to calculate an 8-bit LBP image from a 4-bit LBP image calculated by the method according to the present invention.

Second Embodiment

A detection system using an image processing method according to the present invention will be described. This embodiment shows a case in which the image processing method of the present invention is applied to a pattern detection method. In particular, the image processing method is used as a pattern detection application for detecting "eyes (human eyes)". That is, the embodiment is applied to the image processing method which detects whether eyes are present in an input image.

For descriptive convenience, assume that all images to be dealt with in the embodiment are also gray-scale images (luminance images).

Figure 9:
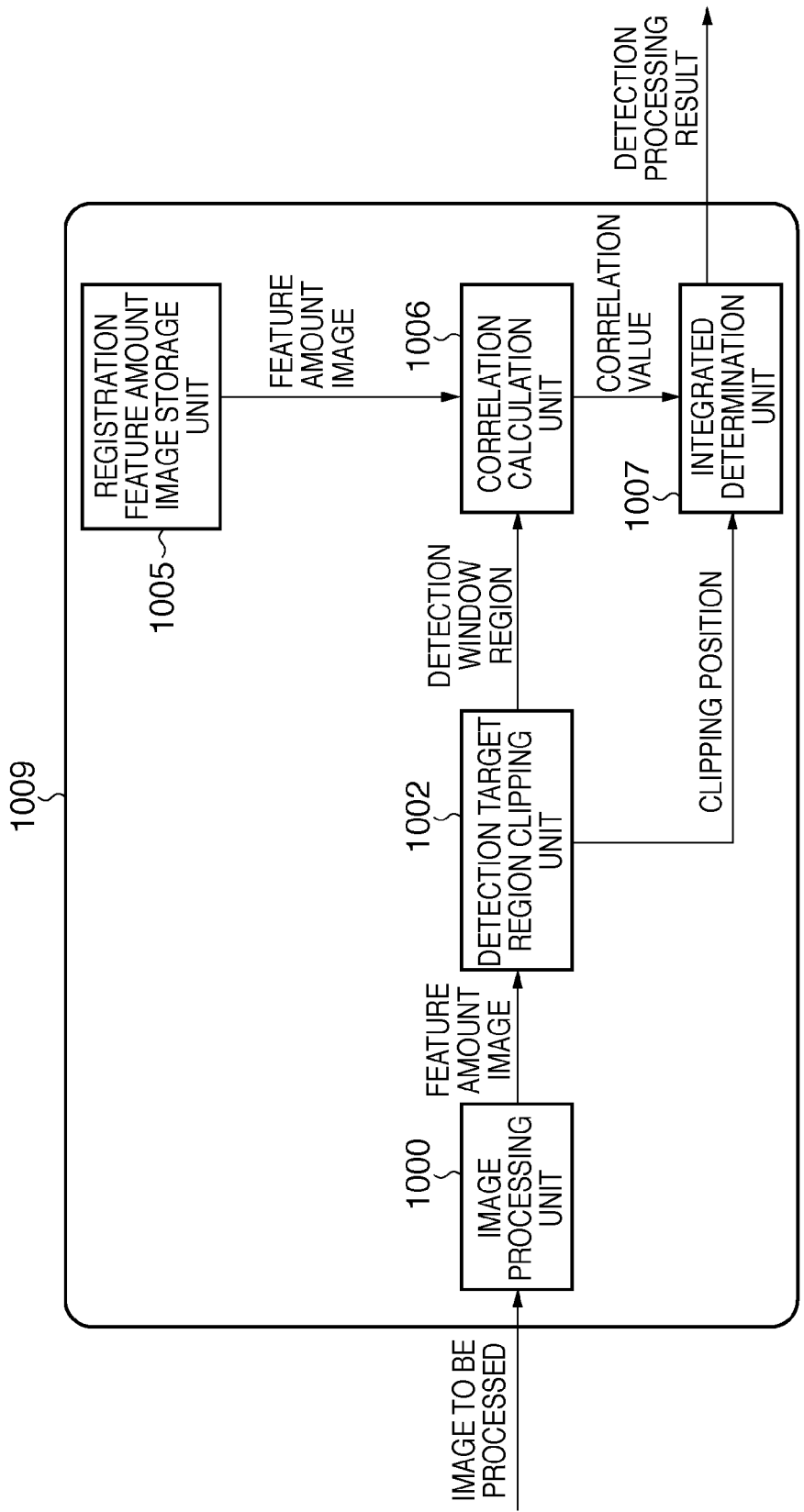
FIG. 9 is a block diagram showing a detection system according to the second embodiment.

FIG. 9 is a block diagram showing an eye detection system according to the second embodiment. A processing image is input to an eye detection system 1009, and the system 1009 outputs a detection processing result. If eyes are determined to be present in the processing image, the system 1009 outputs information for identifying the positions of the eyes as a detection processing result; otherwise, the system 1009 outputs information indicating that no eye is present in the processing image.

An image processing unit 1000 performs feature amount image generation processing for the processing image, and outputs a restored 8-bit LBP feature amount image in the recognition mode. This procedure is the same as that in the recognition mode of the image processing unit 100 in the first embodiment. Note that although a different image, that is, a clipped normalized image or a processing image is input to the image processing unit 100 in each procedure, the processing contents are the same. A detailed description of the image processing unit 1000, therefore, will be omitted.

A detection target region clipping unit 1002 scans a detection window with a predetermined size in part of a feature amount image, and clips a feature amount image within the detection window at a scan position. A clipped region with the size of the detection window will be referred to as a detection window region. The detection target region clipping unit 1002 outputs the position of the clipped detection window region in the feature amount image to an integrated determination unit 1007, and outputs the clipped detection window region to a correlation calculation unit 1006 serving as the second correlation calculation unit.

A registration feature amount image storage unit 1005 stores a 4-bit LBP inspection feature amount image for eyes to be detected. This enables to halve a storage capacity as compared with a usual case. For example, a feature amount image for eyes is created as follows.

A number of images with the same size as that of the detection window within which eyes with almost the same size are present are prepared, and an average image of them is created. The same processing as that executed by the image processing unit 1000 is performed for the average image to get a feature amount image for eyes. The registration feature amount image storage unit 1005 stores the feature amount image.

A 4-bit inspection feature amount image stored in the registration feature amount image storage unit 1005 is output to the correlation calculation unit 1006.

The correlation calculation unit 1006 restores an 8-bit image from the registered 4-bit LBP inspection feature amount image output from the registration feature amount image storage unit 1005, and performs correlation calculation between the 8-bit LBP image of the detection window region output from the detection target region clipping unit 1002 and the restored inspection feature amount image. The restoration method has been described with reference to FIG. 4. The correlation calculation processing is performed as in the first embodiment but is different from the first embodiment in the following points. That is, in the first embodiment, the correlation calculation is performed between a 4-bit feature image and a plurality of registered images to recognize a target pattern. In the second embodiment, the correlation calculation is executed every time a new detection window region is output from the detection target region clipping unit 1002. That is, the detection target region clipping unit 1002 calculates a correlation value every time the detection window moves with respect to the created feature amount image. The calculated correlation values are output to the integrated determination unit 1007.

Based on the correlation values sent from the correlation calculation unit 1006, the integrated determination unit 1007 determines whether eyes are present within the detection window region. That is, the second determination unit (not shown) including the second correlation calculation unit 1006 and the integrated determination unit 1007 determines whether the extracted feature amount image is included in the plurality of registered inspection feature amount images. Since any determination method may be used, a well-known method is used. In this embodiment, if an input correlation value exceeds a predetermined threshold, eyes are determined to be present in the detection window region; otherwise, it is determined that no eye is present in the detection window region. Based on the position of the detection window in the feature amount image and determination of present/absent of a detection target (eyes in this embodiment) for the detection window region clipped at the position, it is possible to detect a position in the processing image at which the detection target is present. The eye detection system using the image processing according to the present invention has been explained. As described above, the configuration according to the second embodiment makes it possible to detect a pattern such as eyes.

Third Embodiment

In this embodiment, a hardware configuration for executing the image processing method described in the first and second embodiments will be described.

FIG. 10 is a block diagram for explaining the hardware configuration of the computer of an information processing apparatus according to the embodiment of the present invention. Referring to FIG. 10, a CPU 1100 is a central processing unit which executes the image processing method described in the first and second embodiments in accordance with a computer program. A program memory 1101 stores a program to be executed by the CPU 1100. A RAM 1102 provides a memory for temporarily storing various pieces of information when the CPU 1100 executes the computer program. A hard disk 1103 is a storage medium for saving image files and the feature amount images of registered images. A display 1104 presents a processing result in this embodiment to the user. A control bus/data bus 1105 connects the above units and the CPU 1100, and serves as an interface for communication/control.

Using hardware with such configuration enables to execute the image processing method according to the present invention.

The above-mentioned hardware configuration is used when the CPU 1100 processes the whole image processing method. Dedicated hardware can execute part of the image processing method instead of the CPU 1100. For example, processing executed by the image processing unit 100 or 1000 can be performed by dedicated hardware.

Other Embodiments

In the above-described embodiments, when quantization processing is performed in the feature amount image generation processing, it is executed depending on the sign of a luminance difference value (that is, comparison with 0). The quantization processing of the present invention is not limited to this. The quantization processing may be performed by, for example, comparing a luminance difference value with a predetermined threshold.

A luminance difference value is obtained by subtracting the luminance value of a pixel of interest from that of a neighboring pixel. A luminance difference value may also be obtained by subtracting the luminance value of the neighboring pixel from that of the pixel of interest.

Although the above explanation was made for a case in which the number of quantization levels is two, the number of quantization levels is not limited to this. For example, three-level quantization may be executed. That is, three levels indicate cases in which the luminance difference value is a positive number, zero, and a negative number. When the three-level quantization is performed (if the luminance difference value is a positive number, it is quantized to 2, if the value is zero, it is quantized to 1, and if the value is a negative number, it is quantized to 0), each quantized value is given a weight value which is a power of 3 using equations (5) and (6). With such quantization processing, a case in which the luminance value of the pixel of interest is equal to that of a neighboring pixel is discriminated from a case in which the luminance values are not equal to each other to undergo quantization. It is, therefore, possible to completely restore a conventional LBP image.

$$LBP4(x_c, y_c) = \sum_{n=0}^{3} s(i_n - i_c)3^n \quad (1)$$

$$s(p) = \begin{cases} 2 & \text{if } p > 0 \\ 1 & \text{if } p = 0 \\ 0 & \text{if } p < 0 \end{cases} \quad (2)$$

A positional relationship between a pixel of interest and a neighboring pixel is not limited to that described in the first to third embodiments. The present invention is characterized in that the feature amount calculation method uses only one of two neighboring pixels at positions which are point symmetry with respect to the pixel of interest to generate a feature amount image. As long as such feature amount image generation method is used, any technique is possible.

The above-described embodiments show a case in which a 4-bit LBP image is used as a feature amount image used for recognition and detection. A 4-bit LBP image calculated in the present invention has the amount of information which is almost the same as that of a conventional 8-bit LBP image including 8-bit LBP values.

In conventional LBP value calculation methods, not only an 8-bit LBP value but also a 4-bit LBP value (four pixels nearest to the pixel of interest are neighboring pixels, and the 4-bit LBP value is different from that in the present invention), a 16-bit LBP value, and a 24-bit LBP value are possible.

FIG. 11 shows a pixel of interest and its neighboring pixels within a processing window (with thick lines) used in an LBP value calculation method. Numbers assigned to pixels in FIG. 11 are indexes for discriminating between the neighboring pixels. Pixels which are not given numbers are not used as neighboring pixels although within the processing window. In the upper portion of FIG. 11, in frames denoted by reference numerals 1200, 1201, and 1202, 4-, 16-, and 24-bit LBP values obtained by a conventional LBP value calculation method are shown.

In contrast to this, as shown in the lower portion of FIG. 11, in frames denoted by reference numerals 1300, 1301, and 1302, the LBP value calculation method according to the present invention can halve the number of bits. That is, 2-, 8-, and 12-bit LBP values are obtained, respectively. Note that a conventional 4-bit LBP value is different from a 4-bit LBP value defined in the present invention.

In the above-described embodiments, as denoted by reference numeral 1300, a pixel of interest and its neighboring pixels are adjacent to each other. The present invention is not limited to this. The neighboring pixels need only be near the pixel of interest. The size of the processing window is not limited, and a size of 5×5 is applicable, as denoted by reference numerals 1301 and 1302.

Since an index assigned to each neighboring pixel is only for discriminating the neighboring pixel from the remaining ones, indexes may be assigned as appropriate when implementing the image processing method of the present invention. As shown in the embodiments, a weight value (an addend to be added in accordance with a neighboring pixel index) may be calculated by a logical operation of a neighboring pixel index and a quantized value, or may be held in a table in a memory.

To calculate a weight value by a logical operation, if the weight value is limited to a power of 2, a shift operation is performed on a quantized value (1 or 0) resulting from quantization. In this case, a shift count is stored for each neighboring pixel index, thereby eliminating the need for storing a weight value itself. In the above-described embodiments, a luminance image is input to the recognition system or detection system. The input image, however, is not limited to a luminance image. If, for example, recognition/detection processing is performed for a color image, processing for converting a color channel into a luminance is executed before the recognition system or detection system. Alternatively, processing for converting an input image into a luminance image convenient for recognition/detection may be performed in the recognition system or detection system, and then the luminance image may be input to the image processing unit. Furthermore, the processing described in the embodiments may be performed for each color channel, and the output results of the color channels may be integrated after the recognition system or detection system.

In the above-described embodiments, to obtain a recognition result or detection result, correlation calculation is performed between LBP images, that is, between a preregistered LBP image and a currently input LBP image. For more explanation, reference is made to the first correlation calculation unit 106 in FIG. 1 and the second correlation calculation unit 1006 in FIG. 10. However, a method for obtaining a recognition result or detection result using LBP images according to the present invention is not limited to this.

For example, a method for creating, from an LBP image calculated in the present invention, histograms each of which has bins labeled by the LBP values of LBP pixels, and comparing the histograms may be used. That is, a method for comparing a histogram created from a preregistered LBP image with that created from a currently input LBP image may be used. An existing method such as histogram intersection is used as a comparison method.

A histogram may be created after restoring an LBP image calculated in a conventional method from an LBP image calculated in the present invention. For example, an 8-bit LBP image obtained in a conventional method is restored from a 4-bit LBP image obtained in the present invention, and then a histogram having bines labeled by the LBP values of the conventional 8-bit LBP image may be created.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-288414, filed Dec. 18, 2009, which is hereby incorporated by reference herein in its entirety.

What is claimed is:

1. An image processing apparatus comprising:
a comparison unit configured to select a pixel of interest in a processing image, and compare magnitudes of luminance value of the pixel of interest and luminance value of each of a plurality of neighboring pixels located at predetermined positions relative to the pixel of interest; and
a calculation unit configured to calculate a feature amount of the pixel of interest by setting different weight values to respective neighboring pixels located at the predetermined positions depending on their positions relative to the pixel of interest, multiplying a weight value set to a respective one of the neighboring pixels located at the predetermined positions and a value representing a comparison result of comparing the luminance value of the pixel of interest and the luminance value of the respective one of the neighboring pixels located at the predetermined positions, and summing up results of multiplication,
wherein for two neighboring pixels at positions which are point symmetrical with respect to the pixel of interest, said comparison unit sets that only one of the two neighboring pixels belongs to the neighboring pixels located at the predetermined positions.

2. The apparatus according to claim 1, further comprising a generation unit configured to generate a comparison result of comparing luminance values of the pixel of interest and another pixel, which does not belong to the neighboring pixels located at the predetermined positions, of the two neighboring pixels at positions which are point symmetrical with respect to the pixel of interest, based on the comparison result obtained by said comparison unit using, as the pixel of interest, the other pixel which does not belong to the neighboring pixels located at the predetermined positions.

3. The apparatus according to claim 2, wherein each of the weight values is set using a power of 2.

4. The apparatus according to claim 1, wherein said calculation unit performs processing of quantizing the comparison result.

5. The apparatus according to claim 1, further comprising:
a registration unit configured to register a plurality of feature amounts calculated by said calculation unit; and
a correlation calculation unit configured to determine whether the feature amounts calculated by said calculation unit and a plurality of registered feature amounts are correlated,
wherein pattern recognition is performed based on the correlation.

6. An image processing method comprising:
a comparison step of selecting a pixel of interest in a processing image, and comparing magnitudes of luminance value of the pixel of interest and luminance value of each of a plurality of neighboring pixels located at predetermined positions relative to the pixel of interest; and
a calculation step of calculating a feature amount of the pixel of interest by setting different weight values to respective neighboring pixels located at the predetermined positions depending on their positions relative to the pixel of interest, multiplying a weight value set to a respective one of the neightoring pixels located at the predetermined positions and a value representing a comparison result of comparing the luminance value of the pixel of interest and the luminance value of the respective one of the neighboring pixels located at the predetermined positions, and summing up results of multiplication,
wherein for two neighboring pixels at positions which are point symmetrical with respect to the pixel of interest, only one of the two neighboring pixels is set to belong to the neighboring pixels located at the predetermined positions in the comparison step.

7. A non-transitory computer readable storage medium storing a program for causing a computer to execute an image processing method according to claim 6.

8. An image processing apparatus comprising:
a comparison unit configured to compare a pixel value of a pixel of interest in an image and a pixel value of each of a plurality of neighboring pixels located at predetermined positions relative to the pixel of interest to obtain a comparison result representing a magnitude relationship between the pixel values of the pixel of interest and each of the neighboring pixels located at predetermined positions; and
a generation unit configured to generate a feature amount of the pixel of interest based on the comparison result with respect to each of the neighboring pixels located at predetermined positions and respective predetermined positions relative to the pixel of interest,
wherein for two neighboring pixels at positions which are point symmetrical with respect to the pixel of interest, said comparison unit sets that only one of the two neighboring pixels belongs to the neighboring pixels located at the predetermined positions.

9. The apparatus according to claim 8, further comprising a deriving unit configured to derive a comparison result of pixel values of the pixel of interest and another pixel, which does not belong to the neighboring pixels located at the predetermined positions, of the two neighboring pixels at positions which are point symmetrical with respect to the pixel of interest, based on the comparison result obtained by said comparison unit using, as the pixel of interest, the other pixel which does not belong to the neighboring pixels located at the predetermined positions.

10. The apparatus according to claim 9,
wherein said generation unit is configured to generate the feature amount of the pixel of interest based on the comparison result with respect to each of the neighboring pixels located at the predetermined positions, the comparison result with respect to each of the neighboring pixels which is not located at the predetermined positions obtained by said deriving unit, and respective positions of the neighboring pixels relative to the pixel of interest.

11. An image processing method comprising:
a comparison step of comparing a pixel value of a pixel of interest in an image and a pixel value of each of a plurality of neighboring pixels located at predetermined positions relative to the pixel of interest to obtain a comparison result representing a magnitude relationship between the pixel values of the pixel of interest and each of the neighboring pixels located at predetermined positions; and a generation step of generating a feature amount of the pixel of interest based on the comparison result with respect to each of the neighboring pixels located at predetermined positions and respective predetermined positions relative to the pixel of interest, wherein for two neighboring pixels at positions which are point symmetrical with respect to the pixel of interest, only one of the two neighboring pixels is set to belong to the neighboring pixels located at the predetermined positions in the comparison step.

12. A non-transitory computer readable medium storing a program for causing a computer to execute an image processing method according to claim 11.

\* \* \* \* \*